United States Patent [19]

Sugino

[11] Patent Number: 5,390,358
[45] Date of Patent: Feb. 14, 1995

[54] ARITHMETIC UNIT THAT REQUIRES ONLY ONE BYTE INSTRUCTIONS

[75] Inventor: Koichi Sugino, Tokyo, Japan

[73] Assignee: Seikosha Co., Ltd., Tokyo, Japan

[21] Appl. No.: 915,493

[22] Filed: Jul. 16, 1992

[30] Foreign Application Priority Data

Jul. 18, 1991 [JP] Japan .................. 3-178249

[51] Int. Cl.6 ............... G06F 9/302; G06F 12/02
[52] U.S. Cl. ................... 395/800; 364/933; 364/944.4; 364/966.1; 364/DIG. 2
[58] Field of Search ............... 395/800, 775, 425, 400, 395/375; 364/736

[56] References Cited

U.S. PATENT DOCUMENTS

| | | | |
|---|---|---|---|
| 4,334,269 | 6/1982 | Shibasaki et al. | 395/775 |
| 4,414,622 | 11/1983 | Matsumoto | 395/400 |
| 4,775,933 | 10/1988 | Sato | 395/400 |
| 4,833,640 | 5/1989 | Baba | 395/650 |
| 4,849,926 | 7/1989 | Hasegawa | 395/800 |
| 5,113,503 | 5/1992 | Sasaki et al. | 395/375 |
| 5,274,777 | 12/1993 | Kawata | 395/375 |

Primary Examiner—Alyssa H. Bowler
Assistant Examiner—Alpesh M. Shah
Attorney, Agent, or Firm—Jordan and Hamburg

[57] ABSTRACT

In an arithmetic unit capable of performing arithmetic operations with single byte instructions or a number of bits less than one byte, an instruction which does not specify any register number is executed under the control of a timing control means and a register number stored in a register-specifying memory is selected. When an instruction which does not specify any address is executed under the control of a timing controller, the address information stored in an address-specifying memory is selected, and then the instruction is performed.

1 Claim, 3 Drawing Sheets

FIG. 2 instruction specifying address     (Define Address)

| 0 | 0 | 0 | 0 | r | | |
|---|---|---|---|---|---|---|
| 0 | 0 | 0 | 1 | r p | | 0 |
| 0 | 0 | 1 | 1 | 1 | 0 | 0 | 0 |
| 0 | 0 | 1 | 1 | 1 | 0 | 0 | 1 |
| 0 | 0 | 1 | 1 | 1 | 0 | 1 | 0 |

DA (V. r)  
DA (r p)  
DA (V. b t)  
DA (w d)  
DA (P C) + load instruction

| 1 | 1 | 0 | 0 | r | |
|---|---|---|---|---|---|
| 1 | 1 | 0 | 1 | r p | X |

LR    Load Register  
LRP    Load Register Pair store instruction

| 1 | 1 | 1 | 0 | r | |
|---|---|---|---|---|---|
| 1 | 1 | 1 | 1 | r p | X |

SR    Save Register  
SRP    Save Register Pair instruction specifying register

| 0 | 0 | 1 | 0 | 0 | r' | |
|---|---|---|---|---|---|---|
| 0 | 0 | 1 | 0 | 1 | r p' | X |

DR    Define Register  
DRP    Define Register Pair arithmetic instruction

| 0 | 0 | 1 | 1 | 0 | 0 | 0 | 0 |
|---|---|---|---|---|---|---|---|
| 0 | 0 | 1 | 1 | 0 | 0 | 0 | 1 |
| 0 | 0 | 1 | 1 | 0 | 0 | 1 | 0 |
| 0 | 0 | 1 | 1 | 0 | 0 | 1 | 1 |
| 0 | 0 | 1 | 1 | 0 | 1 | 0 | 0 |
| 0 | 0 | 1 | 1 | 0 | 1 | 0 | 1 |
| 0 | 0 | 1 | 1 | 0 | 1 | 1 | 0 |
| 0 | 0 | 1 | 1 | 0 | 1 | 1 | 1 |

ADD    Add  
ADC    Add with carry  
SUB    Subtract  
SBC    Subtract with carry  
CMP    Compare  
AND    And  
OR    Or  
XOR    Exclusive or

FIG. 3

| | instruction | operand | |
|---|---|---|---|
| a | DA | [1000H] | |
| b | LR | 1 | ; Load the contents of storage at the address "1000 H" in the storage means 9 into the storage area R1. |
| c | DR | 1 | |
| d | ADD | | ; R0 ← R0 + R1 |
| e | DA | [1001H] | |
| f | LR | 1 | ; Load the contents of storage at the address "1001 H" in the storage means 9 into the storage area R1. |
| g | AND | | ; R0 ← R0 · R1 |
| h | SR | 0 | ; Store the contents of storage area R0 at the address "1001H" in the storage means 9. |

ARITHMETIC UNIT THAT REQUIRES ONLY ONE BYTE INSTRUCTIONS

FIELD OF THE INVENTION

The present invention relates to an arithmetic unit.

BACKGROUND OF THE INVENTION

In an 8-bit microprocessor, for example, the type of arithmetic operation and the number stored in a register used for the arithmetic operation cannot be expressed by one byte and so the arithmetic operation is executed using two byte instructions.

In the above-described prior art unit, each instruction consists of two bytes, so that the configuration of the hardware is complicated and the operational speed is decreased.

SUMMARY OF THE INVENTION

The present invention is directed to the provision of an arithmetic unit capable of executing arithmetic operations with one byte instructions or a number of bits less than one byte.

The present invention solves the foregoing problems by providing a register-specifying means for specifying a register number, and control means which, when an instruction that does not specify any register number is executed, carries out the instruction, using the register number in the register-specifying means.

The above-described problems are also solved by providing addressing means which specifies address information, and control means which, when an instruction that does not specify any address is executed, carries out the instruction using the address information in the address-specifying means.

An embodiment of the invention will be hereinafter described with reference to the drawings.

BRIEF DESCRIPTION OF THE DRAWINGS

FIG. 2 is a diagram illustrating one example of a system of instructions; and

FIG. 3 is a view illustrating the operation in FIG. 1.

DESCRIPTION OF THE PREFERRED EMBODIMENTS

Figure 1:
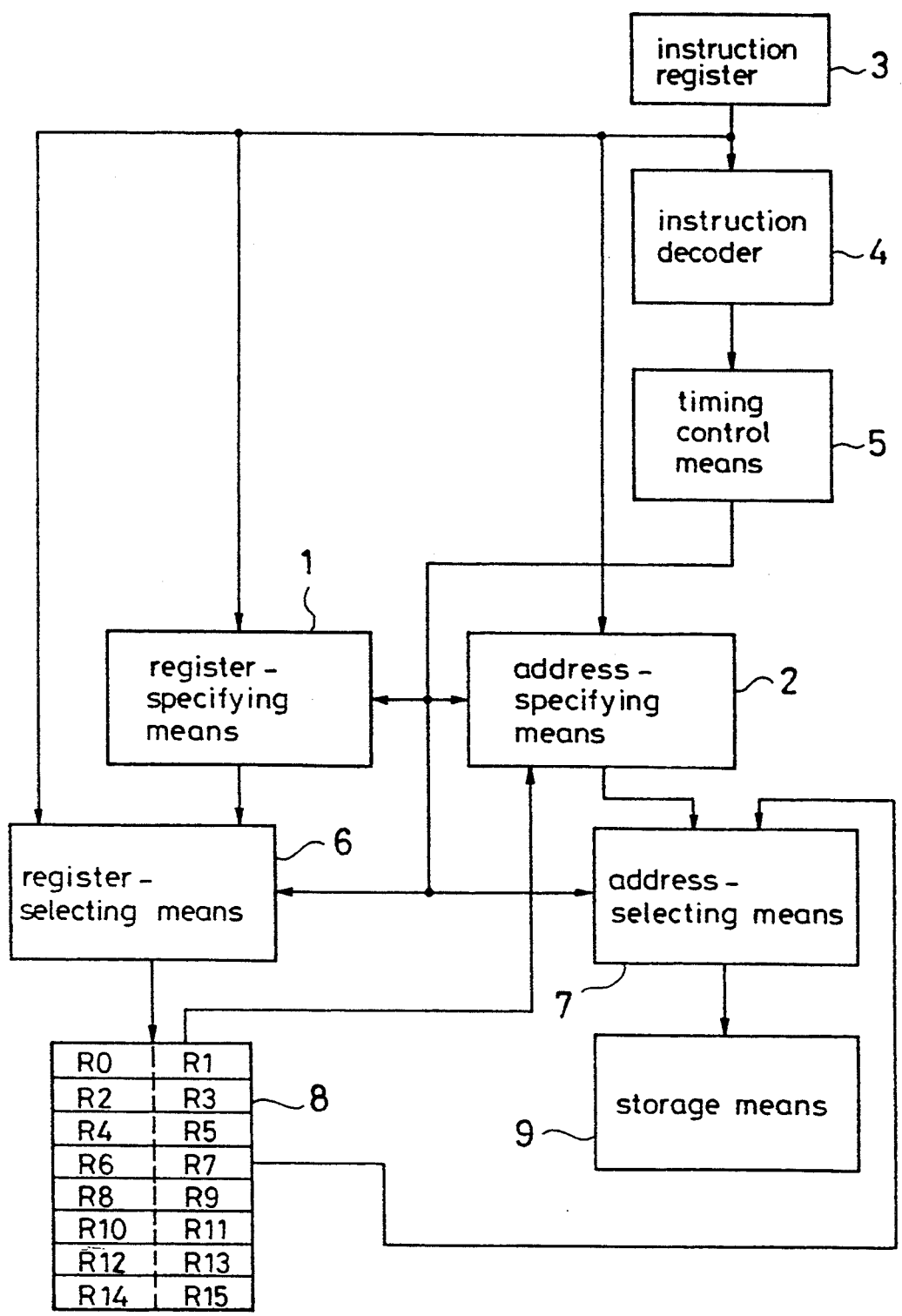
FIG. 1 is a block diagram of one embodiment of the present invention.

FIG. 1 illustrates a part of an 8-bit microprocessor. In this figure, a register-specifying means 1 stores a specified storage area of a register 8. An address-specifying means 2 stores address information. An instruction register 3 temporarily stores an instruction code read out from a memory (not shown). An instruction decoder 4 decodes the instruction code held in the instruction register 3. A timing control means 5 selects a storage area and an address and controls specified timing according to the instruction decoded by the instruction decoder 4. A register-selecting means 6 produces information concerning either the storage area stored in the register-specifying means 1 or the storage area in the instruction code. An address-selecting means 7 produces either the address information stored in the address-specifying means 2 or the address information specified by the register 8. This register 8 consists of storage areas R0-R15. Storage means 9 consists of a RAM or the like.

Various instruction codes are shown in FIG. 2. Every instruction code is expressed in a single byte. Within each byte, "r", "r'", "rp", and "rp'" are operands which specify storage areas used when instructions are executed. Of these operands, "rp" and "rp'" indicate a pair of registers. In this case, the contents of two storage areas in the register 8 are used as 16-bit information. Operands are omitted in arithmetic instructions. Those (not shown) address-specifying instructions which do not include one of the operands "r" and "rp" will be followed by a 2- or 1-byte operand.

The arithmetic operations will now be outlined. When a register instruction is executed, this instruction code is supplied via the instruction register 3 to the instruction decoder 4, where the code is decoded. The timing control means 5 delivers a control signal dependent upon the decoded instruction signal. In response to this control signal, the identification of the storage area in the above-described register-specifying instruction is written to the register-specifying means 1. If an arithmetic instruction is subsequently executed, the storage area used for this arithmetic operation is specified by the storage area stored in the register-specifying means 1. The storage area stored in the register-specifying means 1 is not rewritten until the next register-specifying instruction is performed. This principle also applies to addresses written to the register-specifying means. When an instruction which specifies a storage area such as a load instruction or a store instruction is executed, the storage area in the above-described instruction is selected by the register-selecting means 6 under the control of the timing control means 5.

When an arithmetic operation is executed, an arithmetic instruction and the storage area specified by the register-specifying means 1 can be treated as one instruction. That is, they are regarded as a 2-byte instruction in terms of software. In this way, it is equivalent to the use of a 2-byte arithmetic instruction in terms of software. However, only a 1-byte instruction exists in terms of hardware. Hence, the configuration of the hardware is simplified. Furthermore, once an instruction specifying a register is executed, if subsequent arithmetic operations are performed by the use of the same storage area, then it is not necessary to execute the register-specifying instruction.

When an instruction for specifying an address is performed, then address information accessed by a subsequently executed load instruction or store instruction is placed in the address-specifying means 2. In this way, the principle regarding instructions specifying registers can also apply to instructions specifying addresses.

That is, an address-specifying instruction and a load instruction or store instruction which occupy a plurality of bytes are regarded as one instruction in terms of software, but only a 1-byte instruction exists in terms of hardware. Therefore, the structure of the hardware is simplified. Furthermore, once an address-specifying instruction is executed, it is not necessary to perform the address-specifying instruction again while the same address is kept accessed.

Arithmetic operations will now be described in detail with reference to FIG. 3. First, an address-specifying instruction DA (extended addressing mode, 3 bytes) is executed to address a storage means 9. This address-specifying instruction DA is decoded by the instruction decoder 4 and supplied to the timing control means 5. Thus, the timing control means 5 senses that the instruction specifies an address, and stores the address included in the instruction in the address-specifying means 2.

Now, the operand in the address-specifying instruction specifies address "1000H" (step a).

Then, a load instruction LR is executed. This instruction is also decoded by the instruction decoder 4 and supplied to the timing control means 5. The timing control means 5 senses that the instruction is a load instruction, and controls the register-selecting means 6. Since a storage area in the register 8 is specified in the load instruction, this storage area is selected by the register-selecting means 6 but is not stored in the register-specifying means 1. If the storage area R1 is specified by the operand "r" in the load instruction LR, then the address "1000H" specified by the address-specifying means 2 under the instruction of the address-specifying instruction DA is selected by the address-selecting means 7. The contents of storage at the address "1000H" in the storage means 9 are loaded into the storage area R1 (step b).

Then, a register-specifying instruction DR is executed. In response to this instruction, the storage area in this instruction is stored in the register-specifying means 1 under the control of the timing control means 5. Now, the operand "r'" in the register-specifying instruction DR specifies the storage area R1 (step c).

Subsequently, an arithmetic instruction ADD is executed. Since a storage area of the register 8 is not specified in the arithmetic instruction, the storage area R1 stored in the register-specifying means 1 and specified by the register-specifying instruction DR is selected by the register-selecting means 6 under the control of the timing control means 5. The sum of the contents of the storage area R0 and the contents of the storage area R1 is calculated and stored in the storage area R0 (step d). The area in which the result of the arithmetic operation is stored had been previously allocated to the storage area R0.

Then, an address-specifying instruction DA is executed. If the operand in this instruction specifies an address "1001H", the address stored in the address-specifying means 2 is updated to "1001H" under the control of the timing control means 5 (step e).

Then, the load instruction LR is executed. If the operand "r" in this instruction specifies the storage area R1, the storage area 1 is selected by the register-selecting means 6, in the same way as discussed above. On the other hand, the address "1001H" specified by the address-specifying instruction DA and stored in the address-specifying means 2 is selected by the address-selecting means 7. The contents of storage at the address "1001H" in the storage means 9 are loaded into the storage area R1 (step f).

Then, an arithmetic instruction AND is executed. In the same way as in the case of the aforementioned arithmetic instruction ADD, the storage area stored in the register-specifying means 1 is selected by the register-selecting means 6. Since the storage area R1 is presently stored in the register-specifying means 1, the product of the contents of the storage area R0 and the contents of the storage area R1 is calculated and stored in the storage area R0 (step g).

Then, a store instruction SR is executed. If the storage area R0 is specified by the operand "r" in this instruction, the storage area R0 is selected by the register-selecting means 6 under the control of the timing control means 5. Also, the address "1001H" stored in the address-specifying means 2 is selected by the address-selecting means 7. Then, the contents of the storage area R0 are stored at the address "1001H" in the storage means 9 (step h).

As described above, a specified storage area in the register 8 is stored in the register-specifying means 1 in response to the register-specifying instruction DR. The specified address is stored in the address-specifying means 2 under the address-specifying instruction DA. When instructions which specify neither storage areas nor addresses are executed, the storage area and the addresses stored in the specifying means described above are selected.

In accordance with the present invention, calculations can be performed with single byte instructions, or a number of bits less than one byte. Therefore, the operation speed can be increased. The hardware can be simplified. Also, a reduction in the cost can be accomplished.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

What I claim is:

1. A data processing apparatus comprising:
   an instruction register for receiving instructions,
   a register having a plurality of storage areas,
   a register specifying means for storing register numbers corresponding to separate ones of said storage areas,
   a storage means for selectively storing and loading an information,
   an address specifying means for storing an address information which specifies an address of said storage means,
   a control unit comprising:
      a decoder coupled to decode an instruction stored in said instruction register,
      means, responsive to a first instruction that includes a register number, for storing said register number in said register specifying means and for maintaining said register number in said register specifying means until a new register number is stored therein,
      means, responsive to a second instruction stored in said instruction register that does not include a register number therein, for executing the second instruction using the storage area corresponding to the register number stored in said register specifying means,
      means, responsive to a third instruction that includes an address information, for storing said address information in said address specifying means and for maintaining said address information in said address specifying means until a new address information is stored therein, and
      means, responsive to a fourth instruction stored in said instruction register that does not include an address information therein, for executing said fourth instruction using the address of said storage means corresponding to the address information stored in said address specifying means.

* * * * *